April 29, 1924.

C. A. BODDIE

ANTIHUNTING REGULATOR SYSTEM

Filed Aug. 26, 1919      2 Sheets—Sheet 1

1,492,197

WITNESSES:
H. J. Shelhamer
W. B. Wells

INVENTOR
Clarence A. Boddie
BY
Wesley G. Carr
ATTORNEY

Patented Apr. 29, 1924.

1,492,197

UNITED STATES PATENT OFFICE.

CLARENCE A. BODDIE, OF PITTSBURGH, PENNSYLVANIA, ASSIGNOR TO WESTINGHOUSE ELECTRIC & MANUFACTURING COMPANY, A CORPORATION OF PENNSYLVANIA.

ANTIHUNTING REGULATOR SYSTEM.

Application filed August 26, 1919. Serial No. 319,904.

*To all whom it may concern:*

Be it known that I, CLARENCE A. BODDIE, a citizen of the United States, and a resident of Pittsburgh, in the county of Allegheny and State of Pennsylvania, have invented a new and useful Improvement in Antihunting Regulator Systems, of which the following is a specification.

My invention relates to voltage-regulator systems and particularly to voltage-regulator systems for governing the excitation of supply-circuit generators to maintain substantially constant voltage on supply circuits.

One object of my invention is to provide a voltage-regulator system that shall maintain the voltage on a supply circuit substantially constant in a simple and an efficient manner and that shall be provided with antihunting means to be operated in accordance with variations in excitation of the generator connected to the supply circuit.

In practicing my invention, a main control element, which is operated in accordance with the voltage obtaining on the supply circuit, is provided for selectively operating two switches for governing the rotation of a motor in a clockwise and in a counter-clockwise direction. The motor serves to operate a rheostat for governing the excitation of a generator which is connected to the supply circuit. An auxiliary magnet is energized in accordance with the excitation of the generator and the operation of the rheostat and co-operates with the main magnet to so govern the operation of the switches as to prevent any so-called hunting action.

Figure 1:
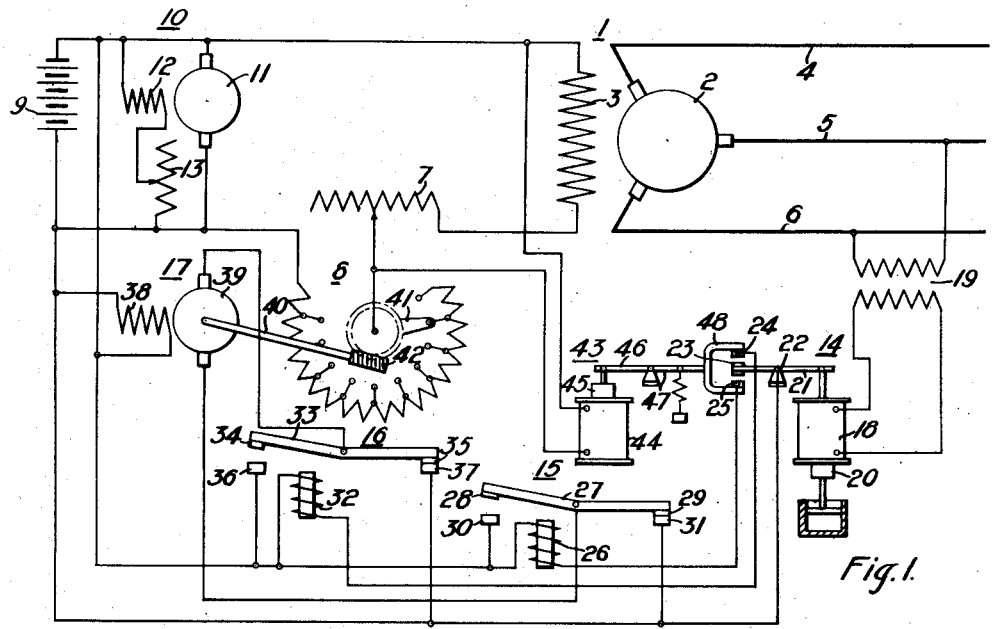
Figure 2:
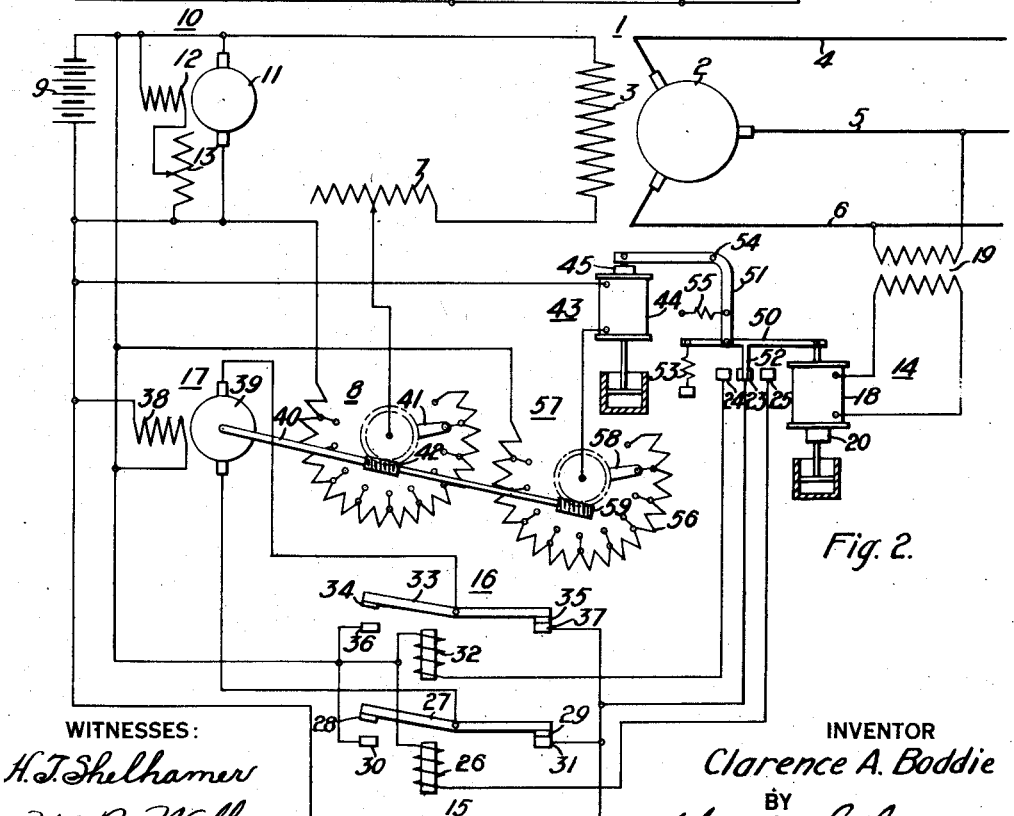
Figure 3:
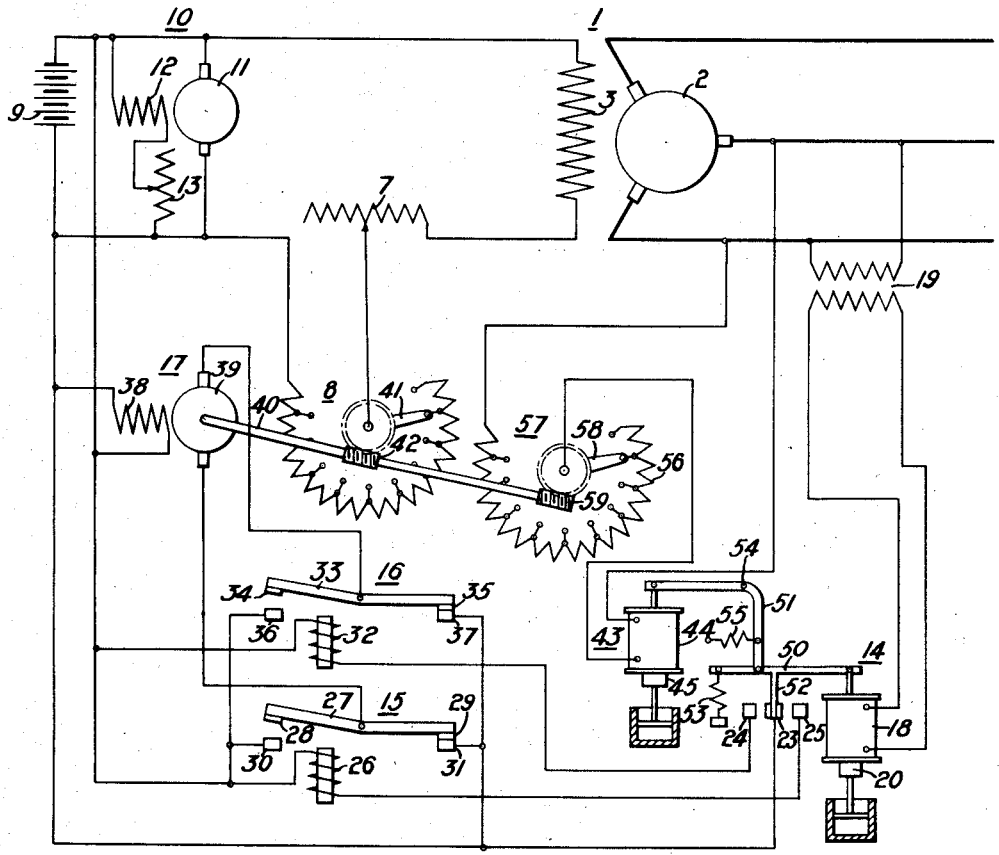

In the accompanying drawing, Figure 1 is a diagrammatic view of a regulator system constructed in accordance with my invention, and Figs. 2 and 3 are diagrammatic views of modifications of my invention.

Referring to the drawing, a main generator 1, comprising an armature 2 and a field winding 3, is connected to a supply circuit comprising conductors 4, 5 and 6. The field winding 3 is connected in series with an adjustable resistor 7 and a rheostat 8 across a battery 9 and an exciter generator 10. The exciter generator 10 comprises an armature 11 and a shunt field winding 12 which is connected in series with an adjustable resistor 13.

A main magnet 14 is provided for selectively operating two switches 15 and 16 to govern a motor 17 for operating the resistor 8. The main magnet 14 comprises a winding 18, which is connected across the supply-circuit conductors 5 and 6 by means of a transformer 19, and a core armature 20 which is pivotally connected to a contact arm 21. The contact arm 21 is fulcrumed at 22 and carries a main contact member 23 which is adapted to engage contact members 24 and 25, according to the operative position of the main magnet 14.

The switch 15 comprises a winding 26 which is connected across the battery 9 and the exciter generator 10, upon engagement between the main contact members 23 and 25. The winding 26 operates a switch arm 27 carrying contact members 28 and 29 which respectively engage contact members 30 and 31, according to the operative position of the switch arm. The switch 16 comprises a winding 32 which is connected across the battery 9 and the exciter generator 10, upon engagement between the contact members 23 and 24, and operates a switch arm 33. The switch arm 33 carries two contact members 34 and 35 which respectively engage contact members 36 and 37 in accordance with the operative position of the switch arm.

The motor 17 comprises a field winding 38, which is directly connected across the battery 9 and the exciter generator 10, and an armature 39 which is connected across the battery 9 and the exciter generator 10 by means of the switches 15 and 16. A shaft 40 of the armature 39 is connected to the rotatable arm 41 of the rheostat 8 in any suitable manner, as by means of the worm gearing 42. The rheostat arm 41 varies the resistance value of the rheostat 8 which is included in circuit with the generator field winding 3.

An auxiliary magnet 43 is provided for so operating the switch members 24 and 25 as to prevent any hunting action. The auxiliary magnet 43 comprises a winding 44 which is connected in series with the resistor of the rheostat 8 and in parallel with the resistor 7 and the field winding 3. The winding 44 operates on a core armature 45 which is pivotally connected to a contact arm 46. The contact arm 46 is fulcrumed at 47 and is provided with a bifurcated end portion 48 which carries the main contact members 24 and 25.

In case a voltage above normal value obtains upon the supply conductors 5 and 6, the energization of the main magnet 14 is increased for operating the contact arm 21 to effect engagement between the contact members 23 and 25. Upon engagement between the contact members 23 and 25, a circuit is completed, from the battery 9 and the exciter generator 10, through the winding 26 of the switch 15 for operating the switch arm 27 to effect engagement between contact members 28 and 30, and to separate contact members 29 and 31. A circuit is completed from one terminal of the battery 9 and the exciter generator 10 through the contact members 28 and 30, switch arm 27, armature 39, switch arm 33 and the contact members 35 and 37 to the other terminals of the battery 9 and the exciter generator 10. The motor 17 is rotated in a counter-clockwise direction to increase the resistance value of the rheostat 8 which is included in circuit with the generator field winding 3. Thus, the excitation of the generator 1 is decreased to lower the voltage obtaining upon the supply conductors 4, 5 and 6.

In case the motor 17 should be controlled solely by the main magnet 14 in accordance with the voltage obtaining upon the supply conductors 5 and 6, the motor would not be de-energized to prevent further reduction in the generator excitation until normal voltage obtained upon the supply conductors 5 and 6 and, consequently, the motor would overtravel to further reduce the excitation of the generator 1 and lower the supply-circuit voltage below normal value. In order to prevent such overtravel and the resulting hunting action, the auxiliary magnet 43 is operated in accordance with the operation of the rheostat 8 and, accordingly, in accordance with the energization of the field winding 3 to effect separation of the contact members 23 and 25 just prior to the obtaining of normal voltage upon the supply conductors 4, 5 and 6. Thus, the switch 15 is released to de-energize the motor 17 at such time that the overtravel of the motor will not underexcite the generator 1 to reduce the supply-circuit voltage below normal value.

If the voltage on the supply conductors 5 and 6 is below normal value, the energization of the main magnet 14 is reduced to effect engagement between the main contact members 24 and 23. Thereupon, the winding 32 of the switch 16 is energized for operating the switch arm 33 to effect engagement between the contact members 34 and 36 and to effect separation of the contact members 35 and 37. A circuit is completed from one terminal of the battery 9 and one terminal of the exciter generator 10 which extends through the contact members 34 and 36, switch arm 33, motor armature 39, switch arm 27 and the contact members 29 and 31 to the other terminals of the battery 9 and the exciter generator 10. The motor 17 is rotated in a clockwise direction for decreasing the resistance value of the rheostat 8 which is included in circuit with the field winding 3. Thus, the excitation of the generator 1 is increased to raise the supply-circuit voltage to normal value.

In order to prevent any hunting action, the energization of the auxiliary magnet 43 is increased to so operate the contact arm 46 as to effect separation of the contact members 23 and 24 just prior to the obtaining of normal voltage on the supply-circuit conductors. The separation of contact members 23 and 24 releases the switch 16 to de-energize the motor 17 at such time as will prevent over-excitation of the generator 1 to raise the voltage of the supply conductors above normal value.

The modified systems disclosed in Figs. 2 and 3 are very similar in construction and in operation to the system disclosed in Fig. 1 and, accordingly, like parts have been indicated by corresponding reference numerals.

Referring to Fig. 2 of the drawing, the core armature 20 of the main magnet 14 is pivotally connected to a contact arm 50 which is pivotally mounted upon a lever arm 51. The contact arm 50 is provided with a downwardly projecting portion 52 which carries the main contact member 23 and with a spring member 53 which counter-balances the core armature 20 of the main magnet 14. The lever arm 51 is pivotally mounted at 54 and is pivotally connected to the core armature 45 of the auxiliary electromagnet 43. A spring member 55 is connected to the lever arm 51 for counter-balancing a portion of the weight of the core armature 45. The winding 44 of the auxiliary magnet 43 is connected in series with the resistor 56 of an auxiliary rheostat 57 across the battery 9 and the exciter generator 10.

The armature shaft 40 of the motor 17 not only operates the rheostat 8 by the gearing 42 but also operates the contact arm 58 of the auxiliary rheostat 57 by means of a worm gearing 59. By means of such connection, the auxiliary magnet 43 is energized in accordance with the operation of the motor 17 and the rheostat 8 and, accordingly, in accordance with the excitation of the main generator 1.

If a voltage above normal value obtains upon the supply conductors 5 and 6, the energization of the main magnet 14 is increased for operating the contact arm 50 to effect engagement between the contact members 23 and 25. Upon engagement between the contact members 23 and 25, the switch 15 is operated to effect counter-clockwise rotation of the motor 17 and of the rheostat arm 41. Consequently, the excitation of the main generator 1 is reduced to lower the supply-circuit voltage.

Simultaneously with the operation of the rheostat 8, the contact arm 58 of the auxiliary rheostat 57 is rotated in a counter-clockwise direction to decrease the energization of the auxiliary electromagnet 43. Upon lowering of the energization of the auxiliary magnet 43, the lever arm 51 is so operated as to oppose the action of the main magnet 14 and to effect separation of the main contact members 23 and 25. Consequently, the contact members 23 and 25 are separated just prior to the obtaining of normal voltage upon the supply conductors to prevent any so-called hunting action.

In case a voltage below normal value obtains upon the supply conductors, the energization of the auxiliary magnet 14 is reduced to effect engagement between the contact members 23 and 24. Thereupon, the switch 16 is operated to effect clockwise rotation of the motor 17 and of the arm 41 of the rheostat 8 for increasing the excitation of the generator 1 to raise the voltage upon the supply conductors. Simultaneously, the contact arm 58 of the auxiliary rheostat 57 is rotated in a clockwise direction for increasing the energization of the auxiliary magnet 43 in accordance with the increase in excitation of the main generator 1. The auxiliary magnet 43 operates the lever arm 51 in a manner to effect disengagement of the contact members 23 and 24 just prior to the obtaining of normal voltage upon the supply conductors so as to prevent any hunting action.

The system disclosed in Fig. 3 of the drawing operates in exactly the same manner as the system disclosed in Fig. 2 of the drawing and is constructed in the same manner with the exception that the winding 44 of the auxiliary magnet 43 is connected in series with the resistor 56 of the auxiliary rheostat 57 across two conductors of the supply circuit in place of being connected across the battery 9 and the exciter generator 10, as in the system disclosed in Fig. 2. By connecting the winding 44 across the supply conductors 5 and 6, the auxiliary magnet is not only operated in accordance with the operation of the auxiliary rheostat 57 and in accordance with the variation in the generator excitation, but also is operated in accordance with the variation in the voltage on the supply circuit.

Modifications in the system and arrangement and location of parts may be made within the spirit and scope of my invention, and such modifications are intended to be covered by the appended claims.

I claim as my invention:

1. In a voltage-regulator system, the combination with a supply circuit and a generator connected to the supply circuit, of a main magnet operated in accordance with the supply-circuit voltage, means comprising a motor-operated rheostat for governing the generator excitation, and an auxiliary magnet for directly controlling said motor-operated rheostat in accordance with the generator excitation to prevent hunting action.

2. In a voltage-regulator system, the combination with a supply circuit, a main generator connected to the supply circuit, a main magnet operated in accordance with the supply-circuit voltage, a rheostat for varying the excitation of the main generator, and means comprising a motor controlled by the main magnet for operating said rheostat to maintain substantially constant supply-circuit voltage, of an auxiliary magnet operated in accordance with the generator excitation for controlling the circuit of said motor to prevent hunting action.

3. In a voltage-regulator system, the combination comprising a main generator, means comprising a motor for varying the excitation of said generator to maintain the generated voltage constant, a plurality of switches, means comprising a main magnet operated in accordance with the generator voltage for selectively operating said switches to control said motor, and means operated in accordance with the generator excitation to control said switches and prevent hunting action.

4. In a voltage-regulator system, the combination with a supply-circuit, and a generator connected to the supply circuit, a rheostat for controlling the excitation of the main generator, a motor for operating the rheostat, and a main magnet operated in accordance with the supply-circuit voltage for controlling said motor to maintain constant supply-circuit voltage, of an auxiliary magnet operated in accordance with operation of said rheostat for controlling said motor to prevent hunting action.

5. In a voltage-regulator system, the combination with a supply circuit and a generator connected thereto, of a main magnet operated in accordance with the supply-circuit voltage, and an auxiliary magnet, a rheostat for varying the generator excitation, a rheostat for varying the excitation of the auxiliary magnet, electroresponsive means for operating both of said rheostats, and means cooperatively controlled by said main magnet and said auxiliary magnet for actuating said electroresponsive means.

6. In a voltage-regulator system, the combination with a supply circuit and a generator connected thereto, of a main magnet operated in accordance with the supply-circuit voltage, and an auxiliary magnet, means for modifying the generator excitation, means for modifying the excitation of the auxiliary magnet, and electroresponsive means for operating said two last mentioned means.

7. In a voltage-regulator system, the combination with a supply circuit and a generator connected thereto, a main magnet operated in accordance with the supply-circuit voltage, and an auxiliary magnet, means comprising a motor-operated rheostat for governing the generator excitation, means comprising a rheostat for governing the excitation of the auxiliary magnet, means actuated by said main magnet and by said auxiliary magnet for controlling said motor-operated rheostat in accordance with the generator excitation and for preventing hunting action.

8. In a regulator system, the combination with a supply circuit and a dynamo-electric machine connected thereto, of coöperating main and auxiliary electromagnets, means for independently varying the excitation of said machine and of at least one of said electromagnets, the actuation of said means being controlled by said main electromagnet.

In testimony whereof, I have hereunto subscribed my name this 12th day of August 1919.

CLARENCE A. BODDIE.